United States Patent [19]

Socias

[11] 3,896,492

[45] July 22, 1975

[54] TAPE-CASSETTE HOLDER FOR MAGNETOPHONIC RECORDING AND REPRODUCTION APPARATUS

[76] Inventor: Arturo Socias, Mallorca 33, Barcelona, Spain

[22] Filed: Apr. 2, 1973

[21] Appl. No.: 347,348

Related U.S. Application Data

[63] Continuation-in-part of Ser. No. 9,904, Feb. 9, 1970, abandoned.

[30] Foreign Application Priority Data

| | | |
|---|---|---|
| Feb. 15, 1969 | Spain | 364085 |
| Nov. 8, 1969 | Spain | 373622 |

[52] U.S. Cl. .................................. 360/93; 242/198

[51] Int. Cl. ...................... G11b 15/24; G11b 23/04

[58] Field of Search .................. 360/96, 94, 93, 71; 242/198

[56] References Cited

UNITED STATES PATENTS

| | | | |
|---|---|---|---|
| 3,167,267 | 1/1965 | Crane | 242/198 |
| 3,273,815 | 9/1966 | Schuller | 242/198 |
| 3,623,678 | 11/1971 | Housman | 274/4 E |

*Primary Examiner*—Stanley M. Urynowicz, Jr.
*Attorney, Agent, or Firm*—Ernest G. Montague; Karl F. Ross; Herbert Dubno

[57] ABSTRACT

A holder for a tape cassette on a magnetophonic apparatus comprises an elongate casing with an open front end projecting through a window in a frame of the apparatus, the casing being swingable about a horizontal axis close to that window between a substantially horizontal working position and a downwardly tilted loading and unloading position. Part of the casing bottom near its rear end is formed by a slider having upstanding hooks engageable by the rear edge of a cassette for rearward entrainment when the cassette is introduced into the casing in its loading position. Upon such entrainment, an articulated linkage fulcrumed on the frame and coupled with the slider levels the casing and lets an upstanding stub shaft engage a cassette reel through a cutout in the slider; at the same time, a pusher hinged to the linkage is advanced into an off-normal position from which it may be manually repressed to restore the tilt of the casing, thereby disengaging the stub shaft from the reel and ejecting the cassette with the aid of the advancing slider.

10 Claims, 4 Drawing Figures

Inventor
Arturo Losias
By Ernest G Montague
Attorney

Inventor

By

Attorney

TAPE-CASSETTE HOLDER FOR MAGNETOPHONIC RECORDING AND REPRODUCTION APPARATUS

CROSS-REFERENCE TO RELATED APPLICATION

This application is a continuation-in-part to my U.S. patent application Ser. No. 9,904, filed on Feb. 9, 1970 and now abandoned.

FIELD OF THE INVENTION

The present invention relates to a mechanism for performing the operations of receiving, retaining and ejecting tape holders of the type known as "cassettes" in magnetophonic recording and reproducing apparatus.

BACKGROUND OF THE INVENTION

At present, widespread use is made of magnetophonic tapes wound on reels contained in rectangular cassettes in such manner that the user is not required to handle the tape directly but may confine himself to disposing these compact elements in the interior of a recording or play-back apparatus, whereupon the tape is ready for actuation by the corresponding drive mechanism.

OBJECTS OF THE INVENTION

It is one object of the present invention to provide a mechanism for receiving, retaining and ejecting tape cassettes in magnetophonic recording or reproducing apparatus, which insures their positioning therein with a high degree of accuracy.

It is another object of the present invention to provide a mechanism of this type which facilitates the manipulation of the oscillating or rocking seatings into which the tape cassettes are introduced, reducing to a minimum the number of manual and mechanical operations required for introduction, engagement and mechanical and electric connection of the cassettes, in such manner that the entire kinematic and mechanical assembly is greatly simplified. More particularly, my invention aims at providing a cassette holder wherein the mere manual introduction of the cassette initiates the first phases involving the mechanical securing and kinematic engagement of the tape reels, whereupon the remaining phases follow, the ejection of the cassette being effected simply by depressing a key.

SUMMARY OF THE INVENTION

These objects are realized, in accordance with my present invention, by providing an elongate casing with an open end projecting through a window in a front wall of a frame, the casing being pivotally mounted on that frame for swinging about a horizontal axis adjacent the window. A rearwardly located cutout in the casing, preferably at the bottom thereof, gives access to a reel of a cassette inserted into same through the front end. A slider in the cutout of the casing has a formation, such as a pair of upstanding prongs, projecting into the interior thereof for rearward entrainment by a rear edge of an inserted cassette. Through an articulated link, such as a rocker member oscillatable in a vertical plane underneath the casing, the slider motion is translated into a swing of the casing from the loading position, in which its front end tilts downwardly, into a substantially horizontal working position upon insertion of a cassette; in that working position, a stub shaft aligned with the cutout of the casing engages a cassette reel accessible through that cutout, such access being blocked by the slider as long as the cassette is not fully inserted. To facilitate a return of the casing to its original position, serving for both loading and unloading, the articulated link mechanically coacts with restoring means in the form of a pusher which can be manually repressed to reverse the swing of the rocker member with consequent tilting of the casing from its horizontal working position and disengagement of the stub shaft of the cassette drive from the reel. Upon such disengagement, the cassette is ejected by a forward shift of the slider.

The operative engagement between the articulated linkage and the casing, required to tilt or level the latter, may be provided by a roller on the rocker member on which the casing rests with its underside forwardly of the cutout.

BRIEF DESCRIPTION OF THE DRAWING

The above and other features of my invention will now be described in detail with reference to the accompanying drawing in which.

SPECIFIC DESCRIPTION

Figure 4:
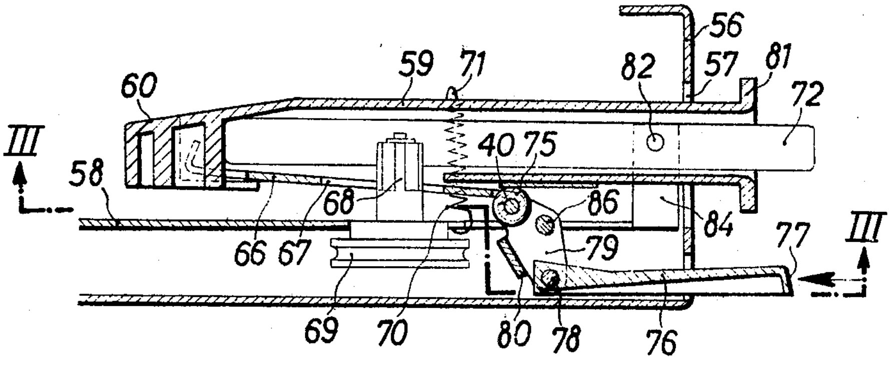
FIG. 4 is a cross-sectional view, similar to FIG. 1 but with the casing in working position, taken on the line IV — IV of FIG. 3.

An apparatus frame 55 (FIG. 1), constituted by a sheet-metal box of parallelepipedic shape, has a front wall 56 with a frame window 57 adjoining a base plate 58 which extends parallel to the bottom of frame 55. A box or casing 59 serves as a receptacle for a tape cassette and has the shape of a flattened tube substantially complementary to but slightly larger than the cassette, an open insertion end of this casing projecting through frame window 57. A rear extension 60 of the box 59 terminates in a support 61 for further functional elements of the apparatus (not shown). Apertures 62 and 63 are formed in the rear wall of the box 59 and are traversed by upbent prongs 64 and 65 at the rear end of a metallic slider 66 which is located centrally of a rear cutout 59*b* of the bottom 59*a* of the box 59 an elongate aperture 67 of slider 66 gives passage to an upright stub shaft 68 which actuates one of the two tape reels contained in the cassette. A pulley 69, rigidly connected with the shaft 68, is actuated by means of a belt from an electric motor (not shown) driving the apparatus. A helical spring 70 connects the box 59 and the base plate 58, the upper end of this spring being fixed to a lateral projection 71 on box 59 to bias some toward the horizontal position, as shown in FIG. 4. A tape cassette 72 of standard dimensions has been shown fitted into casing 59.

A transverse pin 75 passes through lugs 73 and 74 of the slider 66 and pivotally connects a forward portion of that slider to a rocker member 79 at an upper extremity thereof. Another such pin 78 articulates a lower extremity of member 79 to a pusher or key 76, disposed in the lower portion of the assembly and terminating in a projecting front end 77, to be actuated by the user of the apparatus. The horizontal pin 78 articulates the key 76 to the yoke-shaped rocker member 79 whose central portion 80 is substantially rectangular. A roller 40, which may be resilient, is mounted on the horizontal pin 75 at the top of the rocker member 79 and bears upon the undersurface of the casing 59.

A peripheral flange or lip 81 is provided at the mouth of the receiving box 59 for facilitating the introduction of the tape cassette. Gudgeons 82 and 83 defining a horizontal axis for a vertical swing of the casing 59 are journaled in horizontal alignment in the vicinity of the mouth of the box 59 in bosses 84 and 85 which extend from the apparatus frame 55 and are perpendicular to the base plate 58. A horizontal pin 86 is mounted on base plate 58 as a fixed fulcrum for the member 79 between its upper and lower extremities.

In operation, it merely suffices to introduce the cassette 72 into the mouth of the box 59 and to exert a light pressure thereon, whereupon its rear edge will entrain the prongs 64 and 65 of the slider 66 and, consequently, permit the insertion of the shaft 68 into a central bore of a tape reel aligned therewith; simultaneously, the rocker member 79 swings counterclockwise to shift the key 76 into the projecting position shown in FIG. 4, the receptacle 59 being now horizontal.

Figure 1:
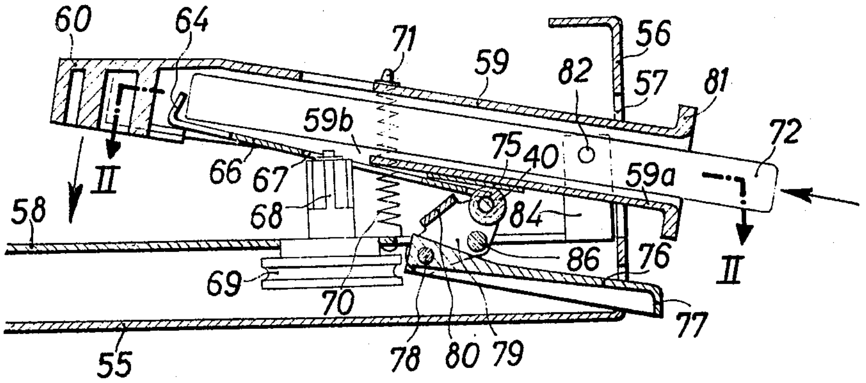
FIG. 1 is a sectional elevational view of a cassette holder according to my invention, taken on the line I — I of FIG. 2, with a cassette-receiving casing thereof shown in loading and unloading position.
Figure 2:
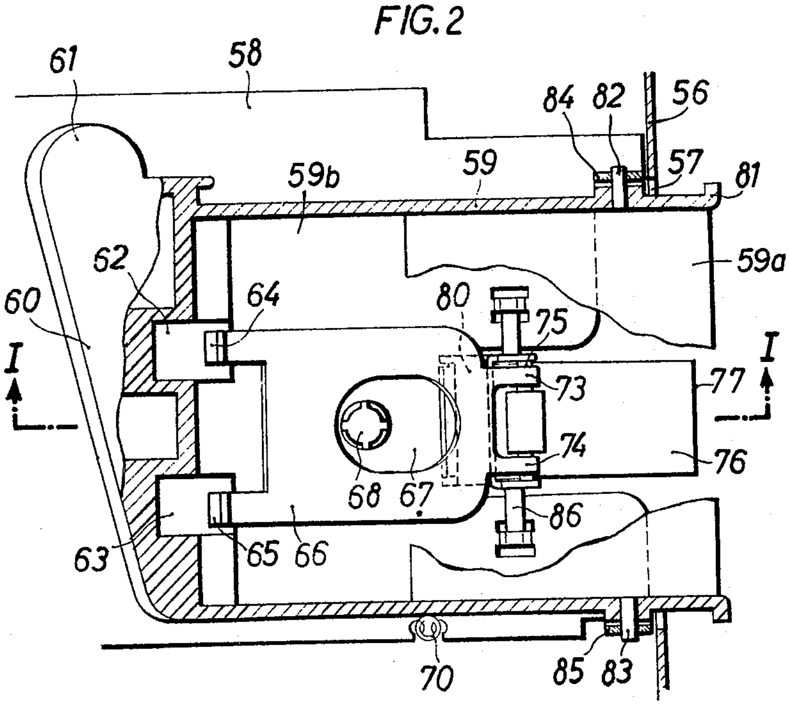
FIG. 2 is a sectional plan view taken on the line II — II of FIG. 1.
Figure 3:
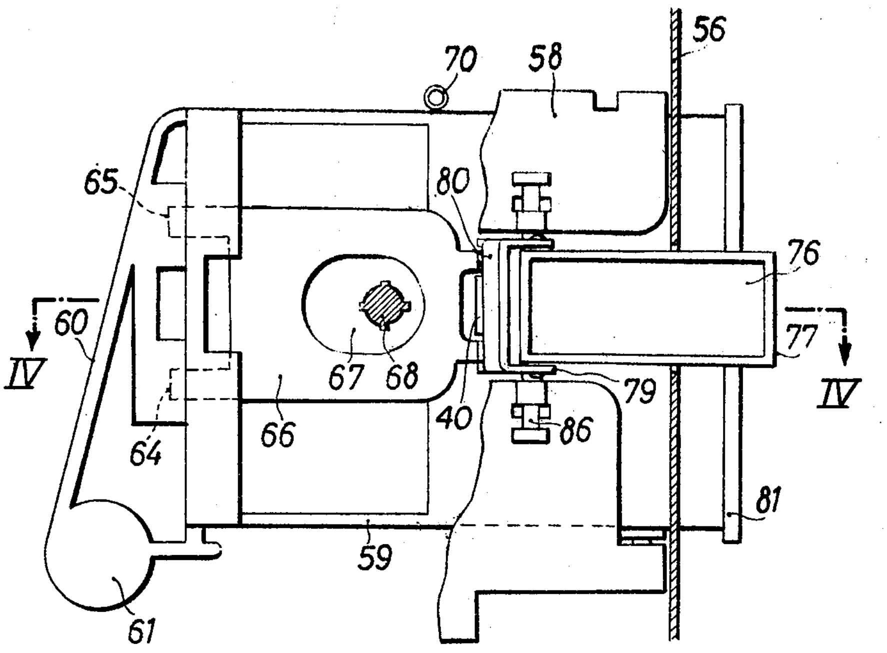
FIG. 3 is a bottom view of the casing and associated elements, in working position, taken on the line III — III of FIG. 4.

In order to extract the cassette, the terminal portion 77 of the key is pressed rearwardly, in the direction indicated by the arrow in FIG. 4, thereby causing a clockwise swing of the rocker member 79 as viewed in FIGS. 1 and 4 with resulting forward shift of the slider 66 toward the right and concurrent ejection of the cassette.

As will be noted from a comparison of FIGS. 1 and 4, the forward shift of key 76 and the clockwise swing of member 79 to pivotally move about the fixed pivot 86 causes a tilting of box 59 from its previous horizontal position to an inclined position, in relation to the frame 55.

This tilting of the casing 59 disengages the stub shaft 68 from its reel, as seen in FIG. 1, on account of the positioning of pivot pin 86 forwardly of that shaft and the location of the fulcrum 82 of the casing close to the window 57.

Although the small opening 57 in the front wall 56 allows only a limited vertical swing of casing 59, rocker member 79 can oscillate through a wide arc so that slider 66 has a large stroke for the ejection of cassette 72. This feature is of great importance for the installation of play-back apparatus in an automobile, especially in the dashboard of the car. The small size of the front opening for admittance of the cartridge is also disirable for esthetic reasons.

While I have disclosed one embodiment of the present invention, it is to be understood that this embodiment is given only by way of example only and not in a limiting sense.

I claim:

1. A holder for a tape cassette provided with a reel accessible from without, comprising:

a frame having a front wall provided with a window;

an elongate casing with an open front end projecting through said window, said casing being pivotally mounted on said frame for swinging about a horizontal axis adjacent said window, said casing having a rearwardly located cutout giving access to a reel of a cassette inserted into said casing through said front end;

a slider in said cutout provided with a formation projecting into the interior of said casing for rearward entrainment by a rear edge of a cassette inserted through said front end;

link means articulated to said frame and to said slider in operative engagement with said casing rearwardly of said horizontal axis for swinging said casing from a loading position into a working position upon insertion of a cassette;

drive means on said frame aligned with said cutout for engagement with the accessible reel of the inserted cassette upon a swinging of said casing into said working position; and restoring means mechanically coacting with said link means for returning said casing to said loading position with concurrent forward shift of said slider to eject the inserted cassette.

2. A holder as defined in claim 1 wherein said cutout is located at the bottom of said casing, the latter being substantially horizontal in said working position and tilting downwardly at said front end in said loading position.

3. A holder as defined in claim 2 wherein said drive means comprises an upstanding stub shaft on said frame.

4. A holder as defined in claim 3 wherein said slider obstructs part of said cutout and has an aperture traversable by said stub shaft upon rearward entrainment of said slider by the inserted cassette.

5. A holder as defined in claim 2 wherein said link means comprises a rocker member having a fixed fulcrum on said frame underneath said casing and forwardly of said cutout, said rocker member having a first extremity remote from said fulcrum articulated to said slider and a second extremity remote from said fulcrum articulated to said restoring means.

6. A holder as defined in claim 5 wherein said casing is of flattened tubular shape.

7. A holder as defined in claim 5 wherein said rocker member is oscillatable in a vertical plane, said first extremity being located above said fulcrum and said second extremity being located below said fulcrum.

8. A holder as defined in claim 7 wherein said restoring means comprises a pusher member with a forward end projecting beyond said front wall.

9. A holder as defined in claim 7 wherein said rocker member is provided at its top with a roller, said casing resting with its underside on said roller.

10. A holder as defined in claim 9 wherein said slider is shiftable along the bottom of said casing and has a forward portion articulated to said first extremity beneath said underside, said formation being an upstanding prong at a rear portion of said slider.

* * * * *